Patented May 5, 1936

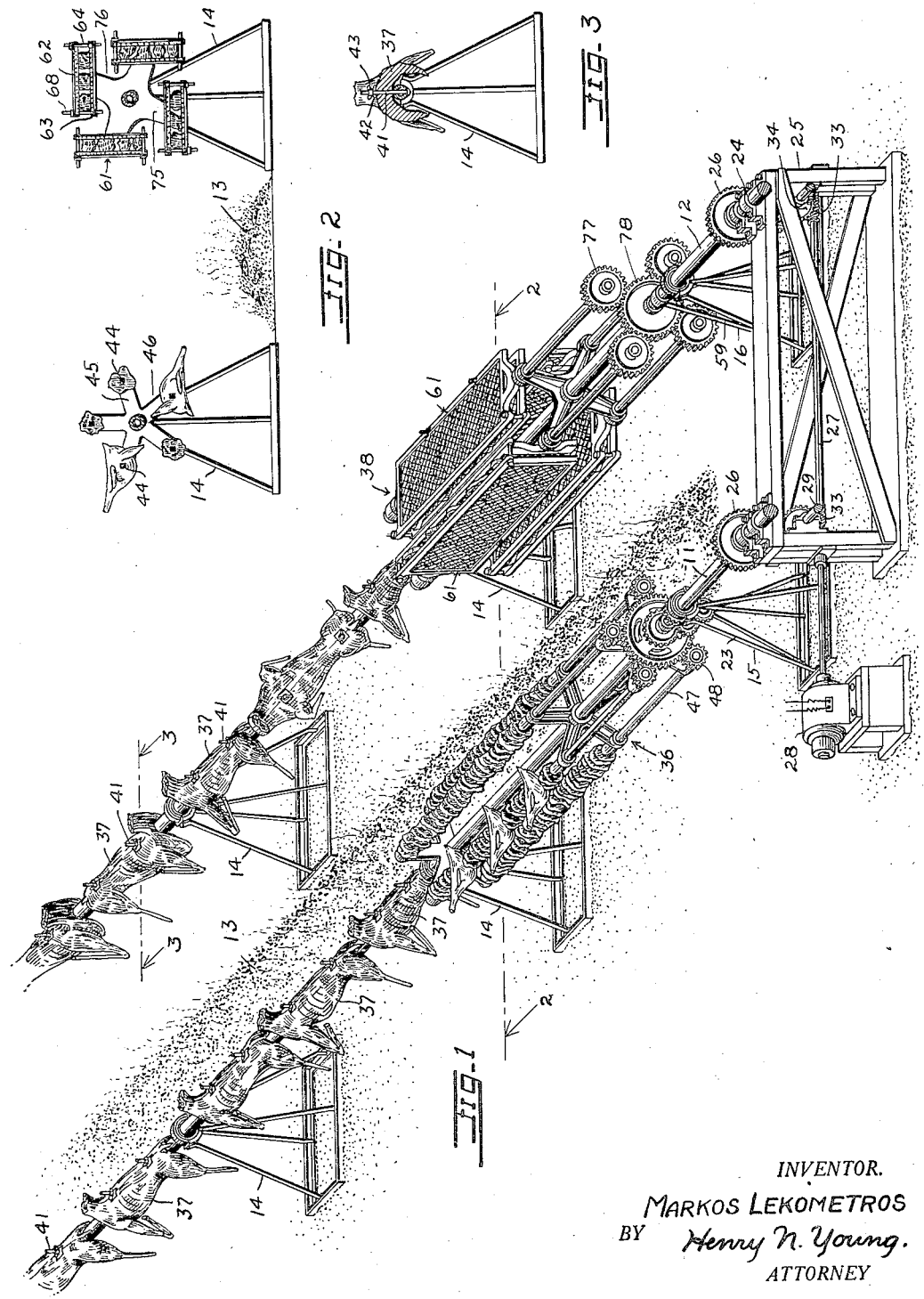

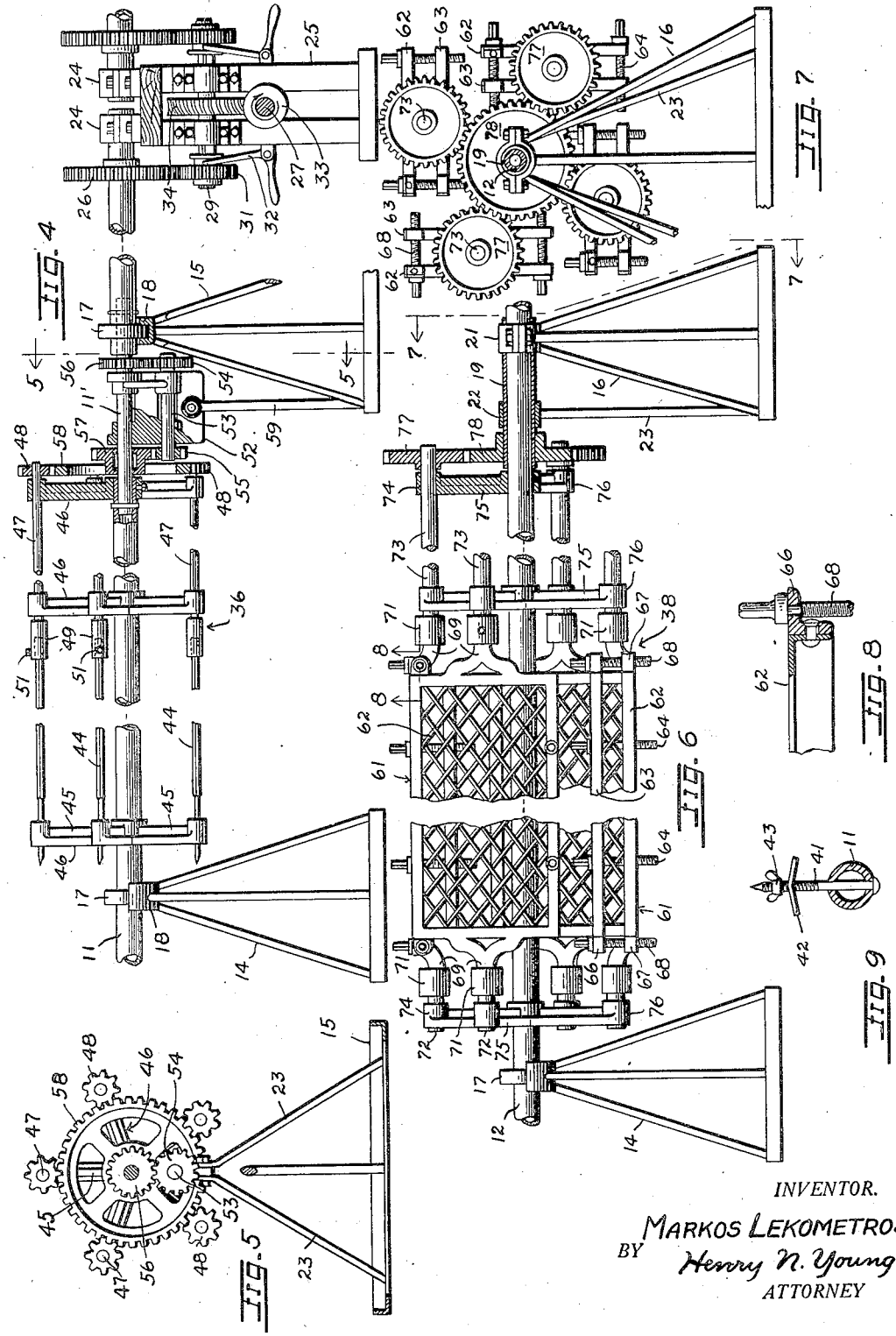

2,039,541

UNITED STATES PATENT OFFICE 2,039,541

BARBECUING APPARATUS

Markos Lekometros, Oakland, Calif.

Application April 11, 1933, Serial No. 665,482

5 Claims. (Cl. 53—5)

The invention relates to barbecuing apparatus which is particularly designed for outdoor use.

An object of the invention is to provide apparatus of the character described which is particularly designed for a quantity barbecuing of meat or other food to be roasted.

Another object is to provide apparatus of the character described for utilizing an elongated bed of coals or charcoal placed on the ground surface as a heat source.

A further object is to provide an improved means for supporting a whole dressed carcass for roasting by mechanically rotating the same before the heat source.

An added object is to provide for improved spit and grill means for appropriately mounting different food elements in the apparatus.

The invention possesses other objects and features of advantage, some of which, with the foregoing, will be set forth or be apparent in the following description of a typical embodiment thereof, and in the accompanying drawings, in which, Figure 1 is a perspective view showing an installation of the apparatus with food mounted thereon.

Figure 2 is a transverse sectional elevation at 2—2 in Figure 1.

Figure 3 is a transverse sectional elevation at 3—3 in Figure 1.

Figure 4 is a fragmentary and enlarged side elevation of a spit assembly and the drive means of the apparatus, portions of the structure being shown in section.

Figure 5 is an elevation at 5—5 in Figure 4.

Figure 6 is an enlarged fragmentary and partially sectional side view of a grill assembly of the apparatus.

Figure 7 is an elevation at 7—7 in Figure 6.

Figure 8 is an enlarged fragmentary section at 8—8 in Figure 6.

Figure 9 is an enlarged view of a portion of the apparatus shown in Figure 3.

In the outdoor barbecuing of meats for large gathering such as picnics it has been a general custom to provide one or more barbecue pits at which the meat is prepared over a bed of coals. When, as frequently happens, the roasting capacity of such a pit or pits is much less than the requirements for the gathering, a number of batches of meat must be roasted in succession, with the result that the preparation of a sufficient supply of roasted meat may require many hours of time and meat first cooked may become dried out and unpalatable. In accordance with the present invention, any quantity of meat may be roasted at the same time whereby all the members of a gathering may eat uniformly roasted meat together. Furthermore, the present apparatus eliminates the necessity for pits and minimizes the fuel required for cooking a given amount of meat. And a still further feature of the present apparatus is the provision for a roasting of whole carcasses on rotating spits which are mechanically turned.

As particularly illustrated, the apparatus of my invention comprises a pair of mutually parallel shafts 11 and 12 for support above the ground in parallel relation thereto and on opposite sides of an elongated fire bed 13, said fire bed comprising coals of charcoal or hardwood. In the present structure, the shaft 11 is supported at spaced points therealong on pyramidal standards 14 and 15, while the shaft 12 is supported at corresponding spaced points therealong on other standards 14 and a standard 16. Bearing rings 17 engage about the shafts 11 and 12 at the standards 14 and 15 and are disposed in suitable sockets at the heads 18 of said standards. An elongated bearing sleeve 19 is fixed to the head 21 of the standard 16, said bearing sleeve extending horizontally from said head through a support ring 22 from which struts 23 extend to the standard base. It will thus be understood that the shafts 11 and 12 are mounted for free rotation with the friction minimized at their bearing points. The shafts 11 and 12 may conveniently comprise sections of pipe fixed together where and as required.

Means are provided for rotating the shafts 11 and 12 together or selectively. Accordingly, and as is particularly shown in Figures 1 and 4, corresponding extremities of the shafts are engaged in bearings 24 mounted adjacent the ends of an elongated frame 25 and carry gears 26 adjacent said bearings. The frame 25 is set transversely of the shafts and fire beyond an end of the latter and mounts a drive shaft 27 extending longitudinally therein, said shaft arranged to be driven at a constant rate and by a suitable means such as the electric motor 28 shown in Figure 1. It is preferred that the shafts 11 and 12 make but about eight revolutions per minute, and to that end suitable speed reduction gearing is provided for operation between the shaft 27 and the gears 26.

As shown, shafts 29 are journalled in the frame 25 below the shafts 11 and 12 and in parallel relation thereto, and these shafts carry gears 31 splined thereto and slidable therealong between different positions thereon to engage or be free of the gears 26. Shift forks 32 engage the hubs of the gears 31 for use in adjusting the positioning of these gears. For effecting the desired speed reduction between the shaft 27 and the shafts 11 and 12, the shaft 27 carries worms 33 engaging worm gears 34 fixed on the shafts 29 mediately thereof; in this manner, the shafts 11 and 12 may be simultaneously or selectively driven at the required speed.

It will now be noticed that the portion of the shaft 11 between the standard 15 and the first standard 14 mounts a rotatable spit assembly 36, and that the further portions of the shaft are arranged for directly mounting dressed carcasses 37 for roasting whole. The portion of the shaft 12 between the standard 16 and the first standard 14 thereof mounts a grill assembly 38, while the further portion of this shaft 12 also mounts carcasses 37. In this manner, the simultaneous roasting of meat of various kinds and shapes is provided for.

Referring now to the manner of mounting the carcasses 37, it is noted that the shafts 11 and 12 thereat have pairs of mutually parallel spikes 41 extending radially therefrom, as is particularly brought out in Figures 1 and 3 and 9. An animal carcass which has been split to the backbone and dressed is applied against a pair of the spikes to force the spikes 41 outwardly through the back whereby the inner side of the backbone may engage with and along the shaft thereat. A perforated washer or plate 42 is placed against the outer carcass surface to receive a spike 41 therethrough, and a nut 43 is then mounted and turned up on each spike to clamp the carcass to the shaft.

It will be noted that the adjustability of clamping provided by the use of the nuts 43 is desirable both for the mounting of carcasses or parts of the same having different thicknesses at the backbone and to take up any slack in the mounting which may develop as the carcass cooks. And it is further to be noted that the peculiar mounting taught disposes the shaft substantially at the longitudinal weight axis of a carcass whereby the carcass is mechanically balanced on the shaft and torsional shaft strains are minimized. The present apparatus is so proportioned that the carcasses 37 may be those of lambs, it being understood however, that the described carcass mounting device is applicable for mounting rabbits or the like on a smaller embodiment or a whole beef on a larger embodiment. It will also be understood that the shaft portions which directly mount the carcasses 37 are operative as spits and may be so referred to.

The spit assembly 36, it will now be noted, mounts a number of spits 44 in parallel and equally spaced relation to each other and to the shaft 11. As particularly illustrated, the spits 44 are mounted in and between the extremities of radial arms 45 of like spider members 46 mounted on the shaft 11 for rotation therewith. It will now be noted that the locus of each spit 44 is a cylinder about the shaft 11 as the latter is rotated, and that material on a spit will always present the same face or portion to the fire 13 unless it is rotated out of synchronism with the shaft. As shown a third spider 46 is mounted on the shaft 11 adjacent the standard 15, and shafts 47 extend between the ends of its arms and those of the nearest other spider to provide, in effect, extensions of the spits 44. The free ends of the shafts 47 carry like gears 48 for use as planetary gears in effecting a rotation of the spits 44 as the shaft 11 is rotated.

At the spit-engaging ends thereof, the shafts 47 are provided with sockets 49 for receiving an end of a spit, the other spit end being loosely journalled in the ends of the arms of the third spider and the remaining spit portion being polygonal, preferably square, in cross section. Set screws 51 fix the spit ends in the sockets 49 and when these screws are loosened the spits may be released longitudinally from the sockets, swung sideways about their journalled end, and then moved oppositely to free them at the latter end. In this manner a spit may be placed in or removed from the spit assembly while loaded.

It will now be noted that in the present instance the spits 44 are arranged to be so rotated that seven revolutions of the shaft 11 are made before each spit will again assume the same rotative relation to the shaft as it had for an initial shaft setting. As shown, a shaft section 11' is journalled in a frame member 52 which carries a jack shaft 53 on which gears 54 and 55 are fixed. The gear 54 meshes with a gear 56 fixed on the shaft portion 11', while the gear 55 meshes with the gear 57 freely rotatable on said shaft portion and fixed to a larger gear 58 which meshes with the gears 48 on the spit shafts 47. The member 52 is kept from swinging or rotating about the shaft 11 by means of struts 59 extending therefrom to the base of the standard 15. It will be obvious that the present arrangement comprises but one possible means to effecting the desired differential in rotative speeds between the shaft 11 and the spits 44, and that other suitable connections might be provided for the purpose. The use of the shafts 47, it is noted, provides for the disposal of the described gear assembly far enough from the end of the fire to avoid an undue heating of this assembly.

Referring to the structure of the grill assembly 38, the same is seen to include grill members 61 comprising rectangular gratings 62 and 63 between which pieces of meat are arranged to be clamped. Each grating 62 and 63 comprises a rectangular frame mounting a piece of heavy wire screening. Bolts are engaged with and between the grating members 62 and 63 at spaced points about the edges thereof whereby to adjust the spacing of the gratings.

As particularly illustrated, a pair of bolts 64 are swivelled in one side element of the frame of the grating 62 for threaded engagement in the opposed side element of the grating 63. Ears 66 and 67 are respectively provided on the ends of the grating members 62 and 63 in general alignment with the other side elements of their frames. The ears 66, it is noted, are swivelled to the frame of the member 62 for rotation about a common axis parallel to the longitudinal axis of the member and bolts 68 are swivelled to these ears in perpendicular relation to said axis, the relation being particularly brought out in Figure 8. The other ends of the bolts 68 are threadedly engaged in the ears 67, which ears are integrally fixed to the member 63. With the present structure, it will be understood that when the bolts 68 are engaged between the ears 66 and 67, the grating members 62 and 63 are hinged together for relative angular movement about the axis of swivelling of the ears 66 whenever the bolts 64 are unscrewed from the frame of the grating 63. The described arrangement, it is noted, also permits a ready adjustment of the spacing of grating members to accommodate meat slabs of different thickness between them.

Trunnions 69 extend axially from the ends of the members 62, said trunnions preferably offset toward the associated members 63 of each grill assembly. The trunnions 69 are fixed in sockets 71 provided at the ends of shafts 72 and 73, and these shafts engage bearing 74 provided at the extremities of the arms 75 of like spiders 76 mounted on the shaft 12 for rotation therewith; in this manner, the various grills 61 are carried for rotation about their axes. A third spider 76 is mounted on the shaft 12 in spaced relation from the grill assembly and beyond the fire end with the bearings at its arm ends receiving the shafts 73. The shafts 73 carry planetary gears 77 at their free extremities and in meshed engagement with a gear 78 non-rotatably fixed to the fixed sleeve 19 which supports the shaft 12 at the standard 15. The relation between the gear 78 and gears 79 is such that the grill faces are differently presented to the fire at successive rotations of the described grill assembly 38 about the shaft 12. In the present instance, seven complete rotations of the grill assembly are required before the various grills again assume their initial relation to each other and to the fire. In this manner, a complete application of heat to the contents of each grill is provided for.

It will now be noted that the disclosed apparatus may be provided to include any desired number and arrangement of its various facilities for presenting material for roasting to a fire on the ground, the line of fire being of the required length for the apparatus actually provided. And it will be further noted that while the spits 44 of the assembly 36 are particularly shown as mounting fowls and meat cubes for roasting, this assembly might be made large enough to carry the whole carcasses of larger animals; in the latter event, the carcasses might be mounted on the spits in the manner hereinbefore described for directly mounting carcasses on the shafts 11 and 12.

From the foregoing description taken in connection with the accompanying drawings, the advantages of the construction and method of operation will be readily understood by those skilled in the art to which the invention appertains, and while I have described the principle of operation, together with a device which I now consider to be the best embodiment thereof, I desire to have it understood that the device shown is merely illustrative, and that such changes may be made, when desired, as fall within the scope of the appended claims.

Having thus described my invention, I claim as new and desire to secure by Letters Patent of the United States the following:

1. A roasting spit comprising a rotatable shaft arranged to mount an animal carcass which has been split to the backbone to have the inner side of the backbone disposed along and against it, a threaded spike extending radially from said shaft for engagement through the backbone of the said carcass, and a nut on the protruding end of said spike for securing the backbone against the shaft.

2. In means to roast a dressed animal carcass which has been split to the backbone, a rotatable spit, a plurality of spikes extending radially from said spit in mutually parallel relation and arranged for simultaneous disposal through the backbone of the carcass from the inside thereof whereby said backbone is arranged for disposal along and against the spit, and means engaging said spikes outwardly of the backbone for releasably clamping the backbone to the spit.

3. A rotatable roasting spit arranged to mount a dressed animal carcass to have the inner side of the backbone of the carcass disposed against and along it, a spike extending radially from said spit for engagement through the backbone of the carcass, and means engaging said spike outwardly of the backbone for releasably clamping the backbone to the spit.

4. In a rotatable roasting spit arranged to mount a unitary mass of food, a spike extending radially from said spit for engagement through a mass of food disposed against the spit, and means engaging said spike outwardly of the food mass for releasably clamping the same to and against the spit.

5. In a rotatable roasting spit arranged for the mounting thereon of a unitary mass of material which has been split to a center line thereof to receive the spit at the bottom of the split, a spike extending radially from said spit for engagement through the mass receiving the spit, and means engaging said spike outwardly of the mass for releasably clamping the mass to the spit.

MARKOS LEKOMETROS.